United States Patent
Tsou et al.

(10) Patent No.: US 8,487,061 B2
(45) Date of Patent: Jul. 16, 2013

(54) STAR HYDROCARBON POLYMER, PROCESS FOR MAKING, AND A POLYMER BLEND COMPOSITION HAVING SAME

(75) Inventors: Andy H. Tsou, Allentown, PA (US); Nikos Hadjichristidis, Athens (GR); Pamela J. Wright, Easton, PA (US); Johannes M. Soulages, Morristown, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 118 days.

(21) Appl. No.: 13/109,313

(22) Filed: May 17, 2011

(65) Prior Publication Data

US 2012/0296046 A1 Nov. 22, 2012

(51) Int. Cl.
*C08G 77/08* (2006.01)
(52) U.S. Cl.
USPC .............. 528/15; 528/14; 528/31; 528/32; 525/105
(58) Field of Classification Search
USPC ................... 528/14, 15, 31, 32; 525/105
See application file for complete search history.

(56) References Cited

U.S. PATENT DOCUMENTS

| 3,595,942 A | * | 7/1971 | Wald et al. | 525/332.9 |
| 4,077,893 A | * | 3/1978 | Kiovsky | 508/233 |
| 5,276,110 A | * | 1/1994 | Zhou et al. | 525/479 |

FOREIGN PATENT DOCUMENTS

EP 0795564 10/2011

OTHER PUBLICATIONS

J. Roovers, L.-L. Zhou, P.M. Toporowski, M. van der Zwan, H. Iatrou and N. Hadjichristidis, "Regular Star Polymers with 64 and 128 Arms. Models for Polymeric Micelles", Macromolecules, vol. 26, No. 16, Aug. 1, 1993, pp. 4324-4331, ISSN 0024-9297.
L.-L. Zhou and J. Roovers, "Synthesis of Novel Carbosilane Dendritic Macromolecules", Macromolecules, vol. 26, No. 26, Mar. 1, 1993, pp. 963-968, ISSN 0024-9297.
N. Hadjichristidis, M. Pitsikalis, S. Pispas and H. Iatrou, "Polymers with Complex Architecture by Living Anionic Polymerization", Chemical Reviews, vol. 101, No. 12, Dec. 1, 2001, pp. 3747-3792, ISSN 0009-2665.

* cited by examiner

*Primary Examiner* — Margaret Moore
(74) *Attorney, Agent, or Firm* — Robert A. Migliorini

(57) ABSTRACT

Provided is a process for making a saturated star hydrocarbon polymer. The process has the following steps: (A) hydrosilylating tetraethylene silicon with methyldichlorosilane in the presence of a hydrosilylating catalyst to form a chlorosilane dendrimer; (B) reacting the chlorosilane dendrimer with vinylmagnesium bromide in the presence of a lithium and/or organolithium initiator stepwise to build a higher generation chlorosilane dendrimer; (C) anionically polymerizing polybutadiene in the presence of a lithium and/or organolithium initiator to form living poly(butadienyl)lithium; (D) attaching the living poly(butadienyl)lithium to the higher generation dendrimer to form a star polybutadiene; and (E) hydrogenating the star polybutadiene to form the saturated star hydrocarbon polymer. There is also provided a saturated star hydrocarbon polymer made according to the above process and a polymer composition of a matrix ethylene polymer and the saturated star hydrocarbon polymer.

7 Claims, 4 Drawing Sheets

Scheme I, Schematic for the Synthesis of a 64-Arm Star Polybutadiene from a 3rd Generation Carbosilane Dendrimer

STAR HYDROCARBON POLYMER, PROCESS FOR MAKING, AND A POLYMER BLEND COMPOSITION HAVING SAME

FIELD

The present disclosure relates to a star hydrocarbon polymer. The present disclosure further relates to a process for making the star hydrocarbon polymer. The present disclosure further relates to a polymer blend composition having the star hydrocarbon polymer.

BACKGROUND

Ethylene-based polymers have been employed in manufacturing film products, such as blown films used in garbage bags. An ethylene-based polymer commonly employed in such blown films is linear low density polyethylene (LLDPE), a semi-crystalline polymer. LLDPE films provide good toughness, puncture resistance, and drop strength, which are important properties for garbage bags.

A conventional means of improving the toughness of a semi-crystalline linear ethylene polymer is to introduce an additive polymer having short- or long-chain branching. Introduction of a branched polymer is known to raise the inter-crystalline connectivity, or so called the tie chain concentration, leading to the enhancement in linear ethylene polymer toughness and strength. High molecular weight linear ethylene polymers contribute to tie chain development as a result of their inability to relax and retract their long chains during the formation of chain-folded crystallites. Short and long-chain branches contribute to tie chain formation since the branches cannot be incorporated into crystallites.

Conventional low density polyethylene (LDPE) typically exhibits a significant degree of short- and/or long-chain branching. LDPE is frequently blended with linear ethylene polymers, such as LLDPE, to enhance resin processability. However, addition of LDPE has the negative effect of reducing the strength and toughness of blends containing LLDPE.

It would be desirable to have a branched ethylene polymer that can be added to a matrix linear ethylene polymer to enhance toughness without diminishing strength. It would be further desirable to have a branched ethylene polymer that can be added to LLDPE to enhance toughness without diminishing strength and processability.

SUMMARY

According to the present disclosure, there is a process for making a saturated star hydrocarbon polymer. The process includes the following steps: (A) hydrosilylating tetraethylene silicon with methyldichlorosilane in the presence of a hydrosilylating catalyst to form a chlorosilane dendrimer; (B) reacting the chlorosilane dendrimer with vinylmagnesium bromide stepwise to build a higher generation chlorosilane dendrimer; (C) anionically polymerizing polybutadiene in the presence of a lithium and/or organolithium initiator to form living poly(butadienyl)lithium; (D) attaching the living poly(butadienyl)lithium to the higher generation dendrimer to form a star polybutadiene; and (E) hydrogenating the star polybutadiene to form the saturated star hydrocarbon polymer.

Further according to the present disclosure, there is a saturated star hydrocarbon polymer made according to the process disclosed above.

DETAILED DESCRIPTION

Figure 1:
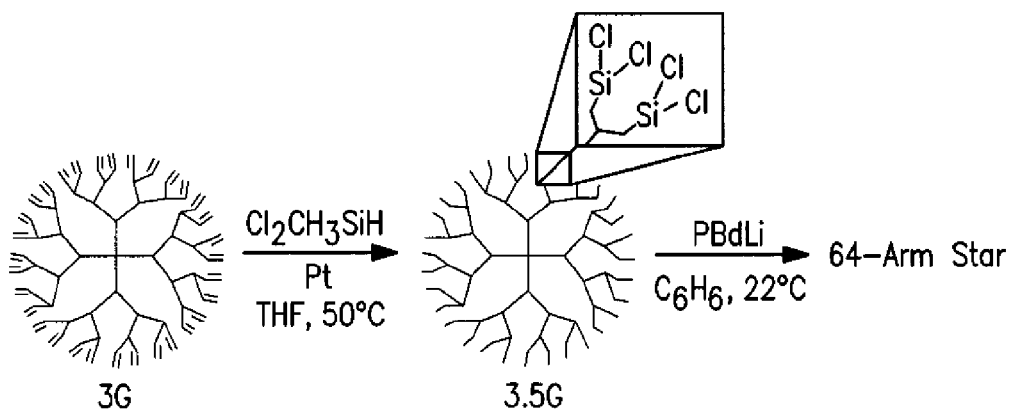
FIG. 1 is a depiction of a reaction sequence for manufacturing a 64-arm polybutadiene star that can subsequently be hydrogenated to form a 64-arm hydrocarbon polymer star.

All numerical values within the detailed description and the claims herein are modified by "about" or "approximately" the indicated value, and take into account experimental error and variations that would be expected by a person having ordinary skill in the art.

Anionic polymerization and condensation chemistry are employed to prepare star polybutadienes (PBd). The star Pbd is subsequently hydrogenated to deliver star hydrocarbon polymers, such as poly(ethylene-butene) random copolymers. Synthesis of the star PBd is carried out via reaction of living poly(butadienyl)lithium with a chlorosilane dendrimer prepared from a vinylcarbosilane dendrimer.

The star hydrocarbon polymer product is a substantially saturated ultra high molecular weight (UHMW) ethylene polymer having a weight average molecular weight ($M_w$) of 900,000 or more and preferably 1,000,000 or more. The star hydrocarbon polymer is semi-crystalline and has 3 or more arms. This star polyolefin is preferred to have 3 to 100 arms, more preferably from 4 to 90 arms, and most preferably from 5 to 80 arms. Each arm preferably has a molecular weight of 10,000 or more and most preferably 20,000 or more.

The star hydrocarbon polymer is useful as an additive to enhance semi-crystalline crystallite interfacial and inter-crystallite connectivities in matrix ethylene polymers. The star hydrocarbon polymer enhances the resilience, toughness and strength of matrix ethylene polymers without significantly compromising processability and stiffness. The star hydrocarbon polymer is added to a matrix ethylene polymer at from 0.01 wt % to 15 wt %, more preferably from 0.05 wt % to 10 wt %, and most preferably from 0.1 wt % to 5 wt % based on the total weight of the blend of the matrix polymer and the additive star polymer. The amount of star hydrocarbon polymer added is preferably sufficient to provide for a greater than 50% toughness improvement compared to the matrix ethylene polymer alone.

The star hydrocarbon polymer can be an ethylene homopolymer or a copolymer of ethylene with one or more alpha-olefin comonomers of 3 to 14 carbons. Copolymers are preferred for their greater incidence of short chain branching compared to homopolymers.

Although not bound by any theory, short chain branches can provide tie chains in between stacked and folded crystallites. In semi-crystalline ethylene polymers, stack crystallites self-assemble into a meso structure of spherulites, cylindrilites, and/or fibrils. Long chain branches can provide connectivity between meso structures. The multi-arm configuration of the star hydrocarbon polymer provides desirable long chain branching for toughness enhancement without compromising the processability, stiffness, and tear balance of a semi-crystalline matrix ethylene polymer. The star hydrocarbon polymer can also have short chain branches in the arms that provide tie chains in between stacked crystallites. Being a relatively symmetric molecule, the star hydrocarbon polymer resists uni-directional orientation and can minimize preferential one-direction stress induced crystallization during processing. Uniaxial orientation of crystallites during processing and manufacture of film is undesirable because it can lead to unbalanced tear strengths in the film.

Star polybutadienes (PBd) can be prepared via reaction of living poly(butadienyl)lithium with a corresponding chlorosilane dendrimer, which can be prepared from an appropriate vinylcarbosilane dendrimer. The synthesis and properties of the vinylcarbosilane dendrimers are disclosed by Zhou, Hadjichristidis, Toporowski, and Roovers in *J. Rubber Chem. Technol.*, 1992, 65, 303 and Zhou and Roovers in *J. Macromolecule* 1993, 26, 963-968, both of which are incorporated by reference herein. Chlorosilane coupling agents are prepared from the vinyl compounds by hydrosilylation with methyldichlorosilane in the presence of platinum catalyst.

The preparation of a fourth generation polybutadiene star (64 arms) through the preparation of successive first (8 arms), second (16 arms), and third (32 arms) generations dendrimer core is shown below.

1$^{st}$ Generation

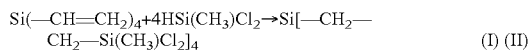

(I) (II)

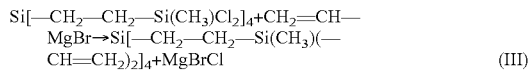

(III)

A second generation dendrimer with 16 vinyl groups (IV) yields a 32-arm coupling agent (V) for the preparation of a 32-arm star.

2$^{nd}$ Generation

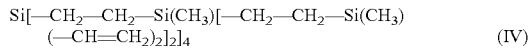

(IV)

Coupling Agent (V)

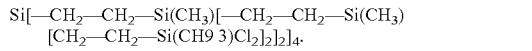

A third generation dendrimer with 32 vinyl groups (VI) yields a dendrimer with 64 silicon-chloride bonds (VII) for the preparation of the 64-arm star. This step is shown schematically in FIG. 1.

3$^{rd}$ Generation

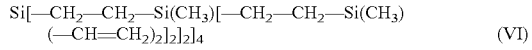

(VI)

Coupling Agent (VII) (64-SiCl)

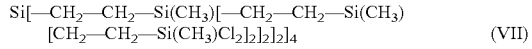

(VII)

Separately, the polybutadiene was synthesized by anionic polymerization with butyl lithium initiator in an organic solvent. Living poly(butadienyl)lithium was prepared to the desirable molecular weight prior their attachment to the selected generation chlorosilane dendrimer core. Additional teachings to the formation of successive generation star Pbd is disclosed in Roovers, Zhou, Toporowski, van der Zwan, Iatrou, Hadjichristidis, *Macromolecules*, 1993, 26, 4324-4331, which is incorporated herein by reference.

The hydrosilylation reaction is carried out in the presence of a catalytically effective amount of a hydrosilylation catalyst. Metallic and organometallic catalysts or initiators are useful in carrying out living polymerization with 1,3-butadiene. Preferred catalysts or initiators are lithium and organo-lithium catalysts or initiators. Suitable organo-lithium catalysts or initiators may be represented by the formula RLi, wherein R is a $C_3$ to $C_{30}$, and preferably a $C_3$ to $C_{10}$, alkyl, aralkyl, and cycloalkyl group. Specific examples of suitable catalysts include n-propyl lithium, isopropyl lithium, n-butyl lithium, tertiary butyl lithium, 2-ethyl hexyl lithium, n-decyl lithium, benzyl lithium, 4-phenyl-n-butyl lithium, and mixtures thereof. Useful butyl lithiums include normal-, secondary-, iso-, and tertiary-butyl lithiums. The reaction may be carried out, for instance, at 50° F. in tetrahydrofuran at one atmosphere under Argon.

Anionic polymerization can be carried out either under vacuum (see N. Hadjichristidis, H. Iatrou, S. Pispas, M. Pitsikalis, "Anionic polymerization: High vacuum techniques" *J. Polym Sci A: Polym Chem,* 38, 3211 (2000) or under argon (Duward F. Shriver and M. A. Drezdzon, "The Manipulation of Air-Sensitive Compounds", 1986, J. Wiley and Sons: New York) using well-known practices. Alkyl hydrocarbon, cyclic (e. g. cyclohexane, cyclopentane) or non-cyclic (e. g. hexane, heptane, octane), as well as aromatic hydrocarbon (e.g. toluene, xylene) can be used as polymerization solvents. If necessary a microstructure modifier can be added. In preferred conditions, the reaction can be carried out at up to 80° C. with up to one hour reaction time. In a particular embodiment, the reaction can be carried out at 25° C. and ~10$^{-6}$ mm Hg pressure for 12 hours. The lithium catalysts/initiators disclosed above may also be used in the anionic polymerization.

The reaction of vinylmagnesium bromide with the chlorosilane dendrimer can be carried out, for instance, at 50° F. in tetrahydrofuran at one atmosphere over 24 hours.

The reaction attaching the living poly(butadienyl)lithium to the higher generation dendrimer can be carried out, for instance, in benzene for 5 to 8 days depending on the molecular weight of the arm.

Hydrogenation can be carried out in the process of the present disclosure by any known catalysis system, including heterogeneous systems and soluble systems. Soluble systems are disclosed in U.S. Pat. No. 4,284,835 at column 1, line 65 through column 9, line 16 as well as U.S. Pat. No. 4,980,331 at column 3 line 40 through column 6, line 28.

Additional teachings to hydrogenation are seen in Rachapudy et al., Journal of Polymer Science: Polymer Physics Edition, Vol. 17, 1211-1222 (1979), which is incorporated herein by reference in its entirety. Table 1 of the article discloses several systems including palladium on various supports (calcium carbonate, but also barium sulfide). The Rachapudy et al. article discloses preparation of homogeneous catalysts and heterogeneous catalysts.

The Rachapudy et al. article discloses a method of preparation of a homogeneous hydrogenation catalyst. The catalyst can be formed by reaction between a metal alkyl and the organic salt of a transition metal. The metal alkyls were n-butyl lithium (in cyclohexane) and triethyl aluminum (in hexane). The metal salts were cobalt and nickel 2-ethyl hexanoates (in hydrocarbon solvents) and platinum and palladium acetyl-acetonates (solids). Hydrogenation was conducted in a 1-liter heavy-wall glass reactor, fitted with a stainless steel flange top and magnetically stirred. A solution of 5 grams of polybutadiene in 500 ml of dry cyclohexane was added, and the reactor was closed and purged with nitrogen. The catalyst complex was prepared separately by adding the transition metal salt to the metal alkyl in cyclohexane under nitrogen. The molar ratio of component metals (alkyl to salt) was generally 3.5/1, the optimum in terms of rate and completeness of hydrogenation. The reactor was heated to 70° C., purged with hydrogen, and the catalyst mixture (usually 0.03 moles of transition metal per mole of double bonds) injected through a rubber septum. Hydrogen pressure was increased to 20 psi (gauge) and the reaction allowed to proceed for approximately 4 hours.

After hydrogenation, the catalyst was decomposed with dilute HCl. The polymer was precipitated with methanol, washed with dilute acid, re-dissolved, re-precipitated and dried under vacuum. Blank experiments with polyethylene in place of polybutadiene confirmed that the washing procedure was sufficient to remove any uncombined catalyst decomposition products.

The Rachapudy et al. article also discloses a method of preparation of a heterogeneous hydrogenation catalyst. A 1-liter high-pressure reactor (Parr Instrument Co.) was used. The catalysts were nickel on kieselguhr (Girdler Co.) and palladium on calcium carbonate (Strem Chemical Co.). Approximately 5 grams of polybutadiene were dissolved in 500 ml of dry cyclohexane, the catalyst was added (approximately 0.01 moles metal/mole of double bonds), and the reactor was purged with hydrogen. The reactor was then pressurized with hydrogen and the temperature raised to the reaction temperature for 3 to 4 hours. For the nickel catalyst, the reaction conditions were 700 psi $H_2$ and 160° C. For palladium, the conditions were 500 psi $H_2$ and 70° C. After reaction the hydrogen was removed and the solution filtered at 70° C. The polymer was precipitated with methanol and dried under vacuum.

The catalysts described herein can be used to hydrogenate hydrocarbons containing saturated carbon bonds. The saturated carbon bonds which may be hydrogenated include olefinic and acetylenic saturated bonds. The process is particularly suitable for the hydrogenation under mild conditions of hydrogenatable organic materials having carbon-to-carbon unsaturation, such as acyclic monoolefins and polyolefins, cyclic monoolefins and polyolefins and mixtures thereof. These materials may be unsubstituted or substituted with additional non-reactive functional groups such as halogens, ether linkages or cyano groups. Exemplary of the types of carbon-to-carbon compounds useful herein are hydrocarbons of 2 to 30 carbon atoms, e.g., olefinic compounds selected from acyclic and cyclic mono-, di- and tri-olefins. The catalysts of this disclosure are also suitable for hydrogenating carbon-to-carbon unsaturation in polymeric materials, for example, in removing unsaturation from butadiene polymers and co-polymers such as styrene-butadiene-styrene.

The hydrogenation reaction herein is normally accomplished at a temperature from 40° C. to 160° C. and preferably from 60° C. to 150° C. Different substrates being hydrogenated will require different optimum temperatures, which can be determined by experimentation. The initial hydrogenation pressures may range up to 3,000 psi partial pressure, at least part of which is present due to the hydrogen. Pressures from 1 to 7500 psig are suitable. Preferred pressures are up to 2000 psig, and most preferred pressures are from 100 to 1000 psig are employed. The reactive conditions are determined by the particular choices of reactants and catalysts. The process may be either batch or continuous. In a batch process, reaction times may vary widely, such as between 0.01 second to 10 hours. In a continuous process, reaction times may vary from 0.1 seconds to 120 minutes and preferably from 0.1 second to 10 minutes.

The ratio of catalyst to material being hydrogenated is generally not critical and may vary widely within the scope of the disclosure. Molar ratios of catalyst to material being hydrogenated between 1:1000 and 10:1 are found to be satisfactory; higher and lower ratios, however, are possible.

If desired, the hydrogenation process may be carried out in the presence of an inert diluent, for example a paraffinic or cycloparaffinic hydrocarbon.

Additional teachings to hydrogenation processes and catalysts are disclosed in U.S. Pat. No. 4,980,331, which is incorporated herein by reference in its entirety.

In general, any of the Group VIII metal compounds known to be useful in the preparation of catalysts for the hydrogenation of ethylenic unsaturation can be used separately or in combination to prepare the catalysts. Suitable compounds, then, include Group VIII metal carboxylates having the formula $(RCOO)_n$ M, wherein M is a Group VIII metal, R is a hydrocarbyl radical having from 1 to 50 carbon atoms, preferably from 5 to 30 carbon atoms, and n is a number equal to the valence of the metal M; alkoxides having the formula $(RCO)_n$ M, wherein M is again a Group VIII metal, R is a hydrocarbon radical having from 1 to 50 carbon atoms, preferably from 5 to 30 carbon atoms, and n is a number equal to the valence of the metal M; chelates of the metal prepared with beta-ketones, alpha-hydroxycarboxylic acids beta-hydroxycarboxylic acids, beta-hydroxycarbonyl compounds and the like; salts of sulfur-containing acids having the general formula $M(SO_x)_n$ and partial esters thereof; and salts of aliphatic and aromatic sulfonic acids having from 1 to 20 carbon atoms. Preferably, the Group VIII metal will be selected from the group consisting of nickel and cobalt. Most preferably, the Group VIII metal will be nickel. The metal carboxylates useful in preparing the catalyst include Group VIII metal salts of hydrocarbon aliphatic acids, hydrocarbon cycloaliphatic acids and hydrocarbon aromatic acids.

Examples of hydrocarbon aliphatic acids include hexanoic acid, ethylhexanoic acid, heptanoic acid, octanoic acid, nonanoic acid, decanoic acid, dodecanoic acid, myristic acid, palmitic acid, stearic acid, oleic acid, linoleic acid, and rhodinic acid. Examples of hydrocarbon aromatic acids include benzoic acid and alkyl-substituted aromatic acids in which the alkyl substitution has from 1 to 20 carbon atoms. Examples of cycloaliphatic acids include naphthenic acid, cyclohexylcarboxylic acid, and abietic-type resin acids.

Suitable chelating agents which may be combined with various Group VIII metal compounds thereby yielding a Group VIII metal chelate compound useful in the preparation of the catalyst include beta-ketones, alpha-hydroxycarboxylic acids, beta-hydroxy carboxylic acids, and beta-hydroxycarbonyl compounds. Examples of beta-ketones that may be used include acetylacetone, 1,3-hexanedione, 3,5-nonadione, methylacetoacetate, and ethylacetoacetate. Examples of alpha-hydroxycarboxylic acids that may be used include lactic acid, glycolic acid, alpha-hydroxyphenylacetic acid, alpha-hydroxy-alpha-phenylacetic acid, and alpha-hydroxycyclohexylacetic acid. Examples of beta-hydroxycarboxylic acids include salicylic acid, and alkyl-substituted salicyclic acids. Examples of beta-hydroxylcarbonyl compounds that may be used include salicylaldehyde, and θ-hydroxyacetophenone.

The metal alkoxides useful in preparing the catalysts include Group VIII metal alkoxides of hydrocarbon aliphatic alcohols, hydrocarbon cycloaliphatic alcohols and hydrocarbon aromatic alcohols. Examples of hydrocarbon aliphatic alcohols include hexanol, ethylhexanol, heptanol, octanol, nonanol, decanol, and dodecanol. The Group VIII metal salts of sulfur-containing acids and partial esters thereof include Group VIII metal salts of sulfonic acid, sulfuric acid, sulphurous acid, and partial esters thereof. Of the sulfonic acids, aromatic sulfonic acids such as benzene sulfonic acid, p-toluene sulfonic acid, are particularly useful.

In general, any of the alkylalumoxane compounds known to be useful in the preparation of olefin polymerization catalysts may be used in the preparation of the hydrogenation catalyst. Alkylalumoxane compounds useful in preparing the catalyst may, then, be cyclic or linear. Cyclic alkylalumoxanes may be represented by the general formula $(R—Al—O)_m$ while linear alkylalumoxanes may be represented by the general formula $R(R—Al—O)_n AlR_2$. In both of the general formulae R will be an alkyl group having from 1 to 8 carbon atoms such as, for example, methyl, ethyl, propyl, butyl, and pentyl, m is an integer from 3 to 40, and n is an integer from 1 to 40. In a preferred embodiment, R will be methyl, m will be a number from 5 to 20 and n will be a number from 10 to 20. As is well known, alkylalumoxanes may be prepared by reacting an aluminum alkyl with water. Usually the resulting product will be a mixture of both linear and cyclic compounds.

Contacting of the aluminum alkyl and water may be accomplished in several ways. For example, the aluminum alkyl may first be dissolved in a suitable solvent such as toluene or an aliphatic hydrocarbon and the solution then contacted with a similar solvent containing relatively minor amounts of moisture. Alternatively, an aluminum alkyl may be contacted with a hydrated salt, such as hydrated copper sulfate or ferrous sulfate. When this method is used, a hydrated ferrous sulfate is frequently used. According to this method, a dilute solution of aluminum alkyl in a suitable solvent such as toluene is contacted with hydrated ferrous sulfate. In general, 1 mole of hydrated ferrous sulfate will be contacted with from 6 to 7 moles of the aluminum trialkyl. When aluminum trimethyl is the aluminum alkyl actually used, methane will be evolved as conversion of the aluminum alkyl to an alkylalumoxane occurs.

In general, any of the Group Ia, IIa or IIIa metal alkyls or hydrides known to be useful in preparing hydrogenation catalysts in the prior art may be used to prepare the hydrogenation catalyst. In general, the Group Ia, IIa or IIIa metal alkyls will be peralkyls with each alkyl group being the same or different containing from 1 to 8 carbon atoms and the hydrides will be perhydrides although alkylhydrides should be equally useful. Aluminum, magnesium and lithium alkyls and hydrides are particularly useful and these compounds are preferred for use in preparing the catalyst. Aluminum trialkyls are most preferred.

The one or more alkylalumoxanes and the one or more Group Ia, IIa or IIIa metal alkyls or hydrides may be combined and then contacted with the one or more Group VIII metal compounds or the one or more alkylalumoxanes and the one or more Group Ia, IIa or IIIa metal alkyls or hydrides may be sequentially contacted with the one or more Group VIII metal compounds with the proviso that when sequential contacting is used, the one or more alkylalumoxanes will be first contacted with the one or more Group VIII metal compounds. Sequential contacting is preferred. With respect to the contacting step the two different reducing agents; i.e., the alkylalumoxanes and the alkyls or hydrides, might react with the Group VIII metal compound in such a way as to yield different reaction products. The Group Ia, IIa and IIIa metal alkyls and hydrides are a stronger reducing agent than the alkylalumoxanes, and, as a result, if the Group VIII metal is allowed to be completely reduced with a Group Ia, IIIa or IIIa metal alkyl or hydride, the alkylalumoxanes might make little or no contribution. If the Group VIII metal is first reduced with one or more alkylalumoxanes, however, the reaction product obtained with the alumoxane might be further reduced or otherwise altered by reaction with a Group Ia, IIa or IIIa metal alkyl or hydride. Whether contacting is accomplished concurrently or sequentially, the one or more alkylalumoxanes will be combined with the one or more Group VIII metal compounds at a concentration sufficient to provide an aluminum to Group VIII metal atomic ratio within the range from 1.5:1 to 20:1 and the one or more Group Ia, IIa or IIIa metal alkyls or hydrides will be combined with one or more Group VIII metal compounds at a concentration sufficient to provide a Group Ia, IIa or IIIa metal to Group VIII metal atomic ratio within the range from 0.1:1 to 20:1. Contact between the one or more Group VIII compounds and the one or more alkylalumoxanes and the one or more alkyls or hydrides will be accomplished at a temperature within the range from 20° C. and 100° C. Contact will typically be continued for a period of time within the range from 1 to 120 minutes. When sequential contacting is used, each of the two contacting steps will be continued for a period of time within this same range.

In general, the hydrogenation catalyst will be prepared by combining the one or more Group VIII metal compounds with the one or more alkylalumoxanes and the one or more Group Ia, IIa or IIIa metal alkyls or hydrides in a suitable solvent. In general, the solvent used for preparing the catalyst may be anyone of those solvents known in the prior art to be useful as solvents for saturated hydrocarbon polymers. Suitable solvents include aliphatic hydrocarbons, such as hexane, heptane, and octane, cycloaliphatic hydrocarbons such as cyclopentane, and cyclohexane, alkyl-substituted cycloaliphatic hydrocarbons such as methylcyclopentane, methylcyclohexane, and methylcyclooctane, aromatic hydrocarbons such as benzene, hydroaromatic hydrocarbons such as decalin and tetralin, alkyl-substituted aromatic hydrocarbons such as toluene and xylene, halogenated aromatic hydrocarbons such as chlorobenzene, and linear and cyclic ethers such as the various dialkyl ethers, polyethers, particularly diethers, and tetrahydrofuran. Suitable hydrogenation catalysts will usually be prepared by combining the catalyst components in a separate vessel prior to feeding the same to the hydrogenation reactor.

Additional teachings to hydrogenation processes and catalysts are disclosed in U.S. Pat. Nos. 4,284,835 and 4,980,331, both of which are incorporated herein by reference in their entirety.

The product star hydrocarbon polymer is substantially saturated after hydrogenation. A polymer is deemed saturated if the incidence of unsaturation is less than 10% and preferably less than 5% and most preferably less than 1% according to solution proton NMR.

The star hydrocarbon polymer of the present disclosure is particularly useful as an additive to modify on the processing/performance of conventional ethylene-based polymers, particularly polyethylenes, such as LDPE, LLDPE, MDPE, and HDPE. The star hydrocarbon polymer is particularly useful in a blend with LLDPE. The polymer additive is useful, for example, in fabricated polymer products such as films, foams, and molded articles.

In a use as a blend additive, the star hydrocarbon polymer is typically present at up to 25 wt % based on the total weight of the star hydrocarbon and any other polymers present, e.g., a matrix polymer constituting a substantial proportion of a polymer blend or polymer article or product fabricated from same.

In addition to its use as an additive to other polymers, the star hydrocarbon polymer is also useful as a matrix polymer, i.e., a polymer constituting a substantial proportion of a polymer article or product.

The following examples are illustrative of the disclosure and are not to be construed as limiting.

EXAMPLES

Multi-arm star random copolymers of ethylene and butane of the present disclosure were prepared. The star copolymers were blended with an LLDPE resin and tested for mechanical properties.

The synthesized chlorosilane dendrimer coupling agents were freed of excess methyldichlorosilane on a high-vacuum manifold and dissolved and degassed in n-BuLi-treated benzene to make solutions with between 0.15 and 0.25 M in Si—Cl. Living poly(butadienyl)lithium was prepared in vacuo with sec-BuLi in benzene at room temperature. The apparatus was washed with a solution of n-BuLi in benzene and rinsed with benzene. All additions were made by fragile break-seals, and removals were done by sealing rinsed constrictions. Prior to the addition of the coupling agent, a sample of the linear arm material is removed and terminated with methanol. The coupling reaction is left 5 to 8 weeks and monitored during that time with SEC (Size Exclusion Chromatography). Five μStyragel columns (nominal pore size 500, $10^3$, $10^4$, $10^5$, and $10^6$ A) were used with THF at 1 mL/min as the eluent at 35° C. Excess living polymer was terminated with degassed tert-butyl alcohol. The star polymer was isolated by repeated fractionation in a benzene-methanol mixture between 30° C. and room temperature. All polymer solutions were protected against oxidation, degradation, and cross-linking by 4-methyl-2,6-di-tert-butylphenol.

Hydrogenation

Polybutadiene (PBd) samples listed in Table 1 were dissolved in p-xylene (0.3 to 0.4 M repeat unit concentrations) in a dry, glass reaction vessel purged with inert gas and fitted with a condenser and stir bar. A small amount (0.1-0.2% by weight polymer) of BHT (butylated hydroxytoluene) was added. The solution was sparged with inert gas for at least one hour before 6 molar equivalents (relative to the polymer repeat unit) of tosylhydrazide was added to the flask. The reaction was heated to 125-130° C. for 6 hours under a blanket of inert gas. The flask was cooled, the contents filtered to remove any solid by-product, and the polymer solution concentrated on a rotary evaporator. The polymer was then precipitated by pouring the concentrated solution into a large excess of stirring methanol. The polymer was further purified by re-precipitation in methanol. The material was dried under vacuum and weighed for yield. Both S1 and S2 have less than 0.5% residual double bonds after hydrogenation as measured by solution NMR. Since each poly(butadienyl)lithium arm containing 15% vinyl in S1 and S2, the hydrogenated S1 and S2, or hS1 and hS2, are multi-arm random copolymers of ethylene and butene with 15% butene.

TABLE 1

(Multi-Arm PBd Stars for Hydrogenation and Blending)

| Sample | Number of arms | Mw of Arm | Final Mw |
|---|---|---|---|
| S1 | 32 | 80,000 | 2.56M |
| S2 | 64 | 80,000 | 5.12M |

Blending and Testing

Samples hS1 and hS2 were blended into Enable™ 2705 (ExxonMobil Chemical) metallocene linear low density polyethylene resin (LLDPE) at 1 and 5 wt % using a ZSM twin-screw miniature extrusion mixer running at 185° C. and 50 RPM for 3 minutes. 0.1% of BHT stabilizer was added in each batch. As listed in Table 2, blend sample B1 is the control resin that was sent through the extrusion mixer without S1 or S2 for 3 minutes along with 0.1% BHT stabilizer. All blend samples were compression-molded into pads at 190° C. for subsequent rheological and mechanical tests.

TABLE 2

(Blend Samples for Testing)

| Sample | Matrix | Additive (wt %) | Stabilizer (wt %) |
|---|---|---|---|
| B1 | Enable 2705 | none | BHT (0.1) |
| B2 | Enable 2705 | hS1* (1) | BHT (0.1) |
| B3 | Enable 2705 | hS1 (5) | BHT (0.1) |
| B4 | Enable 2705 | hS2* (1) | BHT (0.1) |
| B5 | Enable 2705 | hS2 (5) | BHT (0.1) |

*hS1—hydrogenated S1, hS2—hydrogenated S2

Figure 2:
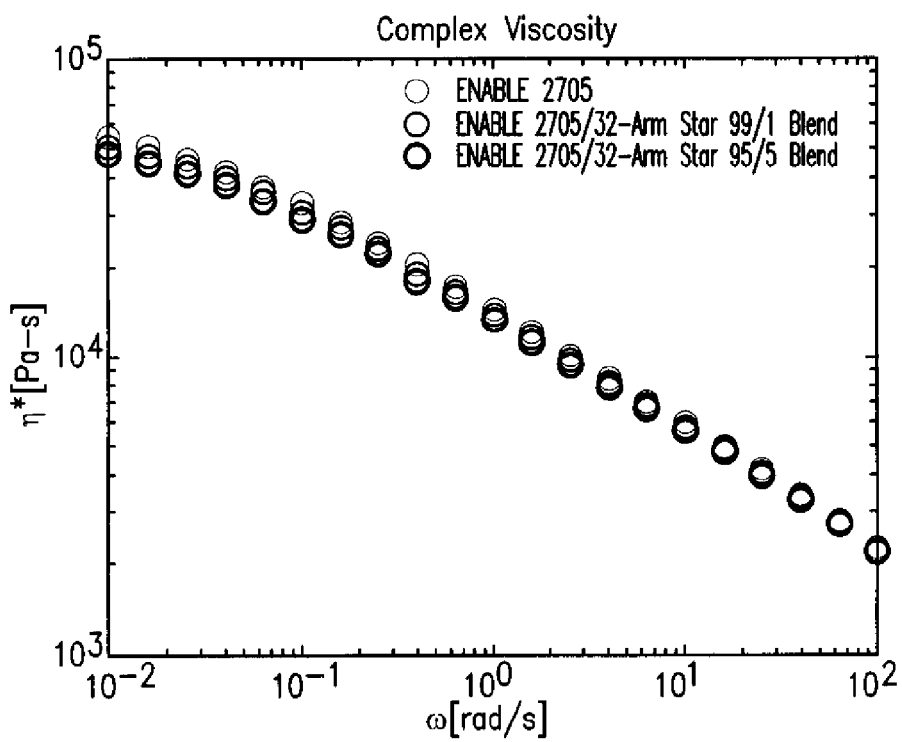
FIG. 2 is a plot setting forth complex viscosity values for B1, B2, and B3.
Figure 3:
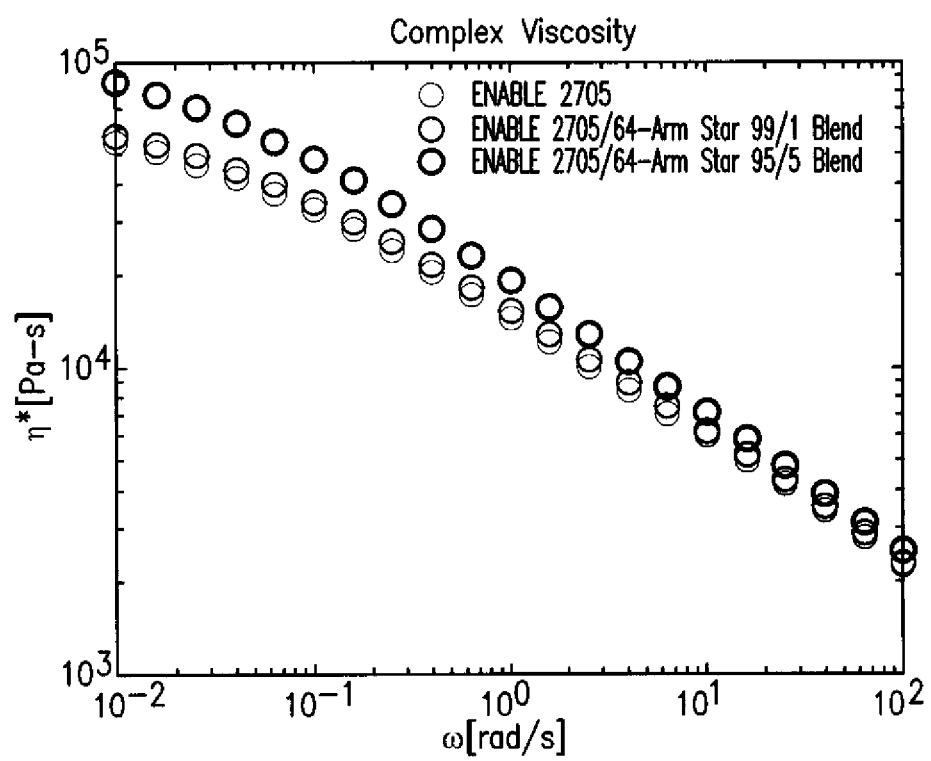
FIG. 3 is a plot setting forth complex viscosity values for B1, B4, and B5 as set forth in FIG. 2.
Figure 4:
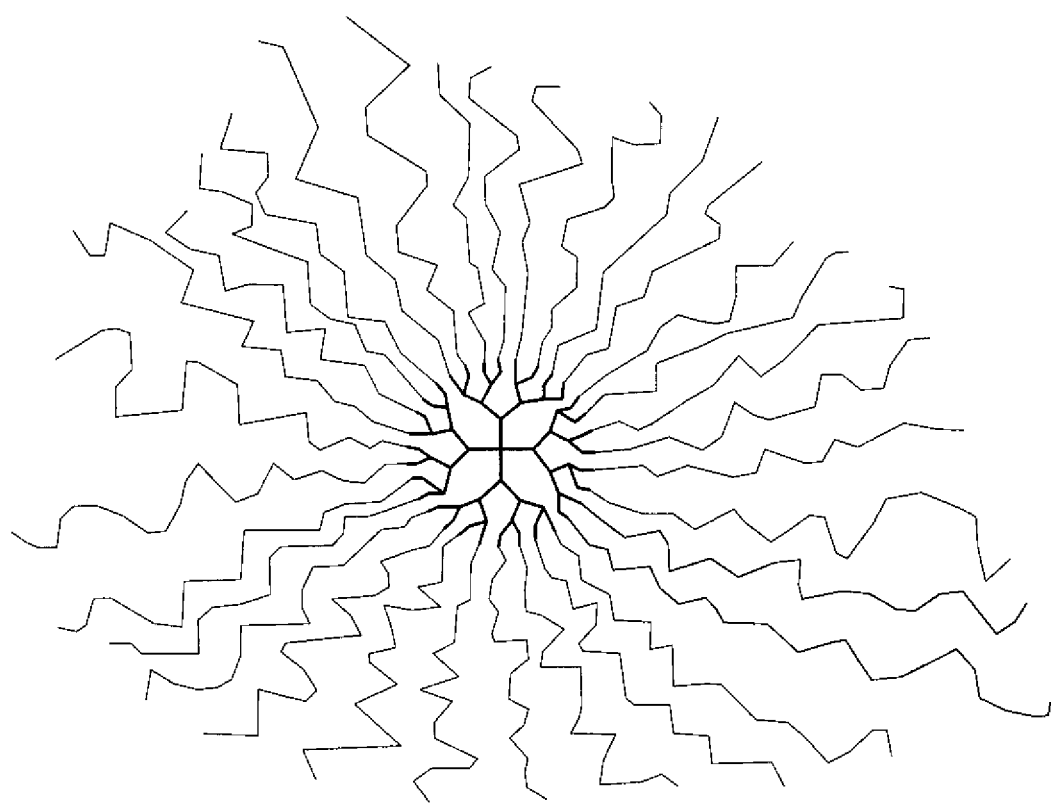
FIG. 4 is a depiction of an example of a hydrocarbon star polymer according to the present disclosure.
Figure 5:
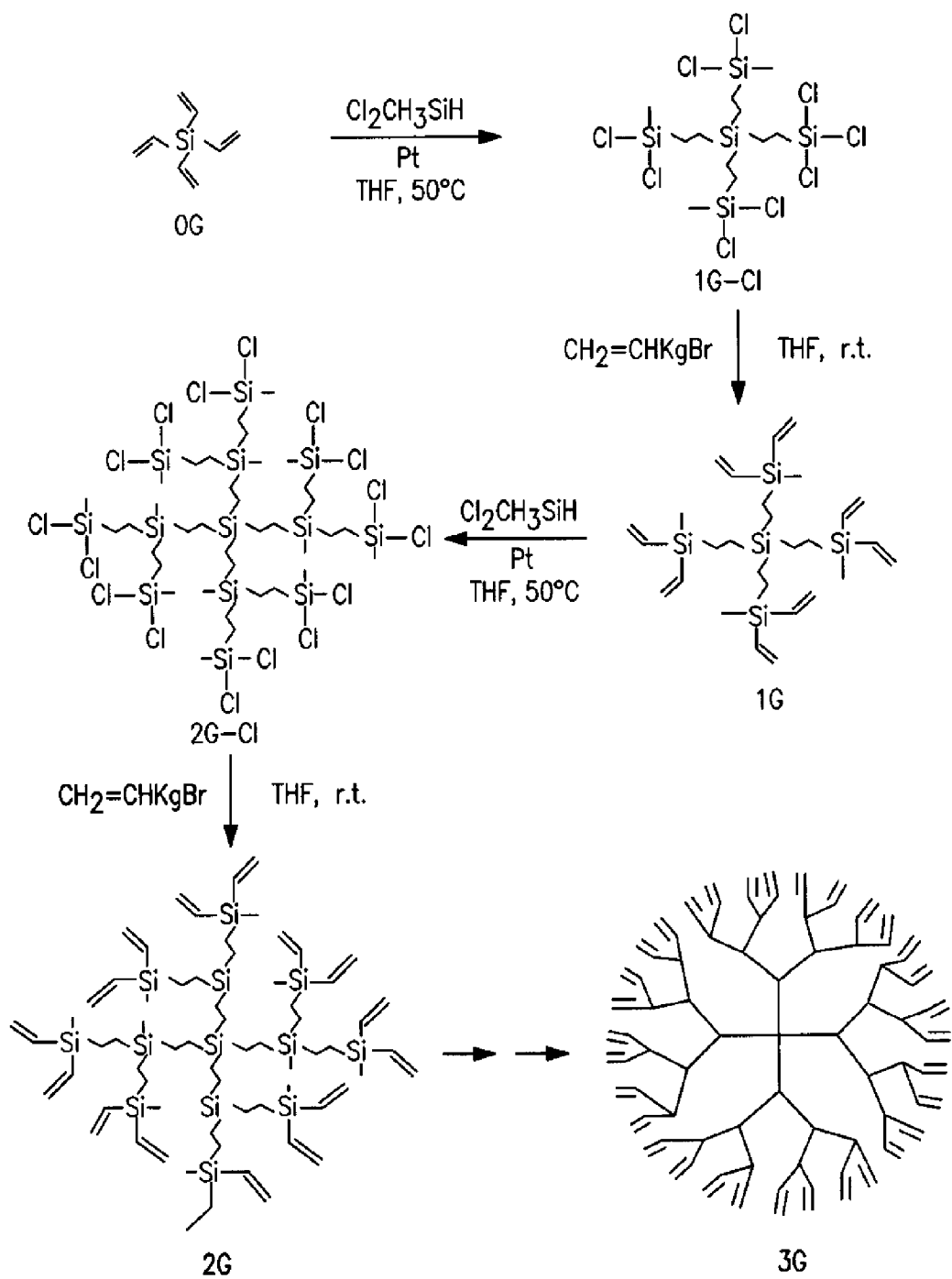
FIG. 5 is another depiction of a reaction sequence for manufacturing a 64-arm polybutadiene star that can subsequently be hydrogenated to form a 64-arm hydrocarbon polymer star.

The rheological properties of all blends samples were tested using an Anton-Paar MCR 501 rheometer in a parallel plate (25 mm diameter) at a controlled strain of 10% at 190° C. Complex viscosity values of B1, B2, and B3 are set forth in FIG. 1. Complex viscosity values of B1, B4, and B5 are set forth in FIG. 2. A significant increase in viscosity can only be found in sample B5 suggesting that the impact on viscosity using a multi-arm UHMW star PE additive can be minimized by keeping the additive concentration below 5 wt %.

Tensile mechanical properties and impact toughness of the blend samples were measured and their results set forth in Table 3. Tensile mechanical properties were determined using an Intron tensile machine following the ASTM D638 procedure. Impact toughness measurement was conducted in accordance with ASTM D256 on Izod impact bars at −50° C. with a 2 J hammer using an instrumented pendulum impact tester.

TABLE 3

(Mechanical Properties of Blends)

| Sample | Tensile Modulus (MPa) | Tensile Strength (MPa) | Impact toughness (KJ/m$^2$) |
|---|---|---|---|
| B1 | 220 | 26 | 10 |
| B2 | 218 | 26 | 21 |
| B3 | 205 | 27 | 14 |
| B4 | 202 | 28 | 23 |
| B5 | 246 | 28 | 25 |

Applicants have attempted to disclose all embodiments and applications of the disclosed subject matter that could be reasonably foreseen. However, there may be unforeseeable, insubstantial modifications that remain as equivalents. While the present invention has been described in conjunction with specific, exemplary embodiments thereof, it is evident that many alterations, modifications, and variations will be apparent to those skilled in the art in light of the foregoing description without departing from the spirit or scope of the present disclosure. Accordingly, the present disclosure is intended to embrace all such alterations, modifications, and variations of the above detailed description.

All patents, test procedures, and other documents cited herein, including priority documents, are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

What is claimed is:

1. A process for making a saturated star hydrocarbon polymer comprising:
   (A) hydrosilylating tetraethylene silicon with methyldichlorosilane in the presence of a hydrosilylating catalyst to form a chlorosilane dendrimer;
   (B) reacting the chlorosilane dendrimer with vinylmagnesium bromide stepwise to build a higher generation chlorosilane dendrimer;
   (C) anionically polymerizing polybutadiene in the presence of a lithium and/or organolithium initiator to form living poly(butadienyl)lithium;
   (D) attaching the living poly(butadienyl)lithium to the higher generation dendrimer to form a star polybutadiene; and
   (E) hydrogenating the star polybutadiene to form the saturated star hydrocarbon polymer, wherein the saturated star hydrocarbon polymer has 32 arms.

2. The process of claim 1, wherein the hydrogenating is carried at a temperature from 40° C. to 160° C., a pressure of 1 to 7500 psig, and a reaction time of 0.1 seconds to 120 minutes.

3. A saturated star hydrocarbon polymer made according to a process comprising:
   (A) hydrosilylating tetraethylene silicon with methyldichlorosilane in the presence of a hydrosilylating catalyst to form a chlorosilane dendrimer;
   (B) reacting the chlorosilane dendrimer with vinylmagnesium bromide stepwise to build a higher generation chlorosilane dendrimer;
   (C) anionically polymerizing polybutadiene in the presence of a lithium and/or organolithium initiator to form living poly(butadienyl)lithium;
   (D) attaching the living poly(butadienyl)lithium to the higher generation dendrimer to form a star polybutadiene; and
   (E) hydrogenating the star polybutadiene to form the saturated star hydrocarbon polymer, wherein the saturated star hydrocarbon polymer has 32 arms.

4. The star hydrocarbon polymer of claim 3, wherein the saturated star hydrocarbon polymer has a weight average molecular weight ($M_W$) of 900,000 or more.

5. A polymer composition comprising a matrix ethylene polymer and from 0.01 wt % to 25 wt % of the saturated star hydrocarbon polymer of claim 3 based on the total weight of the blend of the matrix ethylene polymer and the star hydrocarbon polymer.

6. The polymer composition of claim 5, wherein the saturated star hydrocarbon polymer is present at 0.01 wt % to 15 wt % based on the total weight of the blend of the matrix ethylene polymer and the star hydrocarbon polymer.

7. The polymer composition of claim 6, wherein the matrix ethylene polymer is chosen from LDPE, LLDPE, MDPE, and HDPE.

* * * * *